INVENTORS,
JAMES SAMUEL
JAMES SALERNO

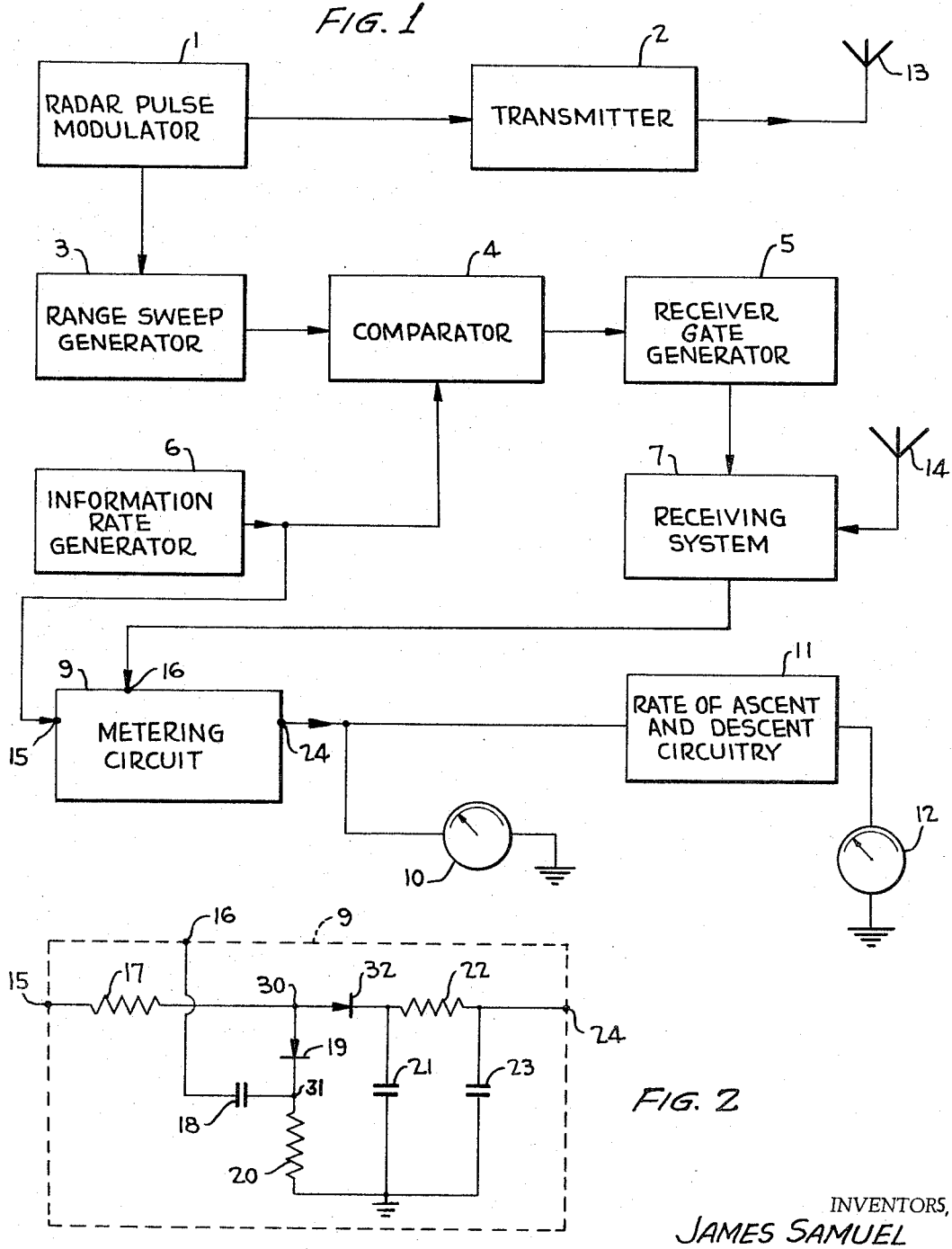

United States Patent Office

3,305,862
Patented Feb. 21, 1967

3,305,862
SIGNAL SEEKING PULSE RADAR ALTIMETER
AND DISTANCE MEASURING SYSTEMS
James Samuel, Washington, D.C., and James Salerno, Rockville, Md., assignors to the United States of America as represented by the Secretary of the Army
Filed Feb. 6, 1962, Ser. No. 171,541
16 Claims. (Cl. 343—13)

The invention described herein may be manufactured and used by or for the Government for governmental purposes without the payment to us of any royalty thereon.

This invention relates to pulse modulation distance measuring systems and more particularly to radar altimeters of the pulse position, or pulse time, modulation type.

As aircraft flight speeds and airport traffic continue to increase, a need for accurate instruments to facilitate landings under conditions of poor visibility proportionally increases. As airport traffic becomes more dense, the practices of rerouting aircraft to other airports, or of keeping the aircraft aloft in holding patterns during conditions of poor visibility become increasingly undesirable. A primary requirement for coping with these difficulties is an altimeter capable of producing accurate readings down to low levels of altitude. Such an altimeter would also be of great value in flight and during landing under normal visibility conditions. An altimeter capable of high accuracy in the zero to 100-foot range, in conjunction with a high resolution surveillance radar, could furnish the pilot, or a computer in an automatic landing system, sufficient information to make a zero-visibility landing.

An object of the invention is to provide a pulse modulated radar system of great accuracy, especially in the low altitude range.

Another object of this invention is to provide a radar altimeter capable of being adjusted to have varying sensitivity over its operating range.

A further object of this invention is to provide a radar altimeter capable of use with any existing type of pulse radar system.

A still further object of this invention is to provide a radar altimeter comprising readily available, relatively inexpensive circuitry requiring little maintenance.

A feature of the invention involves the use of an arbitrary wave form generator having a relatively low repetition rate with respect to the radar pulse transmission rate. Typically, the rate of the former is in the range of 1% of that of the latter. This relatively slow wave form provides the altitude information, and is therefore known as the "information signal." In the simplest form of this device, the information signal is a linear wave form, thereby providing an indication which has the same sensitivity over each portion of the instrument range. In another form of the invention, the sensitivity of the altitude measurement may be made greater for a preselected portion of the instrument range by decreasing the rate of change of the part of the information signal wave form corresponding to that range portion. With most applications of this invention, it is expected that it will be desired that the sensitivity be increased for the low altitude range (0 to 100 feet), although it is not the intention of the applicants to limit this feature of their invention to any particular range.

Another feature of this invention resides in the fact that distortions in the information signal wave form will have no effect on the accuracy of the altitude readings. This will be explained more fully in connection with the description of the operation of the preferred embodiment of this invention.

A typical embodiment of a pulse modulator altimeter system in accordance with the present invention comprises a generator for producing a linear waveform triggered by the transmitted pulses from the associated radar and having a period equal to or less than the time between said pulses, a second generator adapted to produce the information signal, and a comparator receiving the output of the two generators and producing a pulse when the instantaneous amplitudes of these two outputs are equal. This pulse is used to activate the radar receiver for a time equal to the pulse duration. A metering circuit has its information input connected to the output of the second generator, and means connecting the radar receiving system to a gate input of the metering circuit permits said metering circuit to transmit the output of the second generator only when a pulse is received by the radar receiving system while it is in its activated condition. At the instant when a comparator pulse and a received pulse coincide, the instantaneous output of the second generator, known as the "information rate generator," is transmitted to a storage and indicating means. The storage means retains this voltage until the next instant at which the metering circuit is permitted to transmit. The indicating means continuously indicates the amplitude of the storage voltage. Any type of known pulse radar transmitter may be used with this invention, but it is preferred that the type used be of such nature that the output pulse from the receiving system have sufficient energy and width to activate the measuring circuit. However, if such is not the case it is possible, without departing from the spirit of this invention, to insert a pulse stretcher and/or amplifier between the output of the radar receiving system and the input of the metering circuit. The opening of the radar receiver is achieved by connecting the comparator output to the input of a gate generator and the output of the gate generator to a control input of the radar receiver. The gate generator produces a gating pulse of short duration in response to the output pulse from the comparator. The radar receiving system is then activated only during the instant that a pulse is being produced by the gate generator. Since it is the output from the radar receiving system which activates the metering circuit, and since this output can only be produced during the instant that the gate generator renders the radar receiving system operative, it may be seen that this metering circuit will only transmit when the comparator is producing an output pulse at the same instant as the radar system is receiving a reflected pulse.

The specific nature of the invention, as well as other objects, uses, and advantages thereof, will clearly appear from the following description and from the accompanying drawings, in which:

FIG. 1 is a schematic block diagram of a preferred embodiment of this invention.

FIG. 2 is a schematic diagram of a preferred embodiment of the metering circuit of FIG. 1.

Figure 3A:
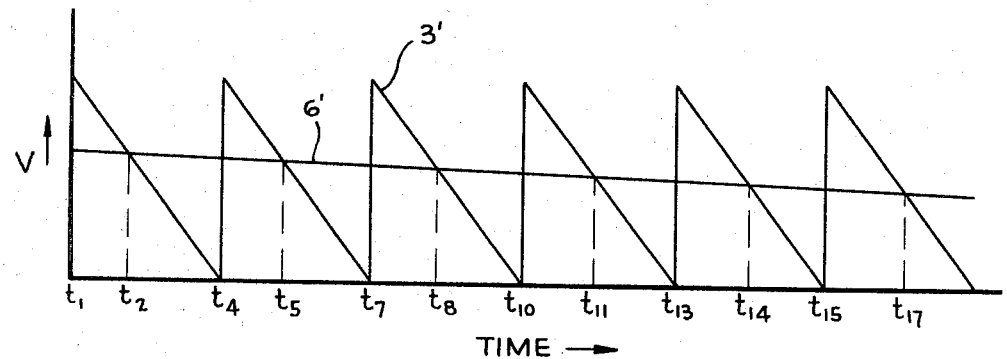
FIGS. 3A, 3B and 3C are graphs of certain wave forms appearing at various points in the circuit of FIG. 1.

In one conventional form of pulse modulated radar there is provided a pulse modulator for producing a series of pulses having a short duration and a high energy content. These pulses are transmitted by means of a highly directional antenna. When these pulses strike some reflecting surface, a portion of their energy is reflected back toward the transmitter. The reflected signal is received at the radar system at a time after the transmission of the pulse equal to $$t = \frac{2h}{c} \tag{1}$$

where $h$ is the distance from the transmitter to the reflecting surface and $c$ is the velocity of light. This time interval is then measured and utilized to indicate the distance between the transmitter and the reflecting surface. Generally, this measuring operation is performed by the use of a cathode ray device having a horizontal sweep rate equal to the generation rate of the radar pulse modulator. The cathode ray device is adapted to produce a continuous beam so as to generate a straight horizontal line on the face of the cathode ray tube when the radar system is not transmitting. The vertical deflection system of the cathode ray device is connected so as to produce a first deflection each time that the pulse modulator of the radar set transmits a pulse and to produce a second deflection each time that a reflected pulse is received by the system. Thus, by measuring the distance on the face of the cathode ray tube between the first and second pulses, a measurement of the distance of the radar system from the reflecting surface may be obtained. Because this procedure is too distracting and time consuming for a pilot making a landing, this system is not suitable as a low altitude altimeter.

The altimeter system of the present invention however, utilizes the transmitting and receiving portions of the conventional pulse modulated system in combination with the additional circuitry which forms a combination capable of producing an altitude indication on a standard voltmeter which is therefore easy to read.

Referring now to FIG. 1, there is shown a block diagram of the altimeter system of this invention. Blocks 1, 2 and 7 represent the pulse modulator, transmitter, and receiving system, respectively, of the conventional pulse modulated radar system. These elements are all well known in the art and need not be described in detail. The radar system shown also comprises transmitting antenna 13 and receiving antenna 14. These antennas could be replaced by a single antenna combined with a duplexer (not shown) in a manner well known in the art without departing from the spirit of this invention. The output of pulse modulator 1 is connected to the input of range sweep generator 3 and serves to initiate a linear sawtooth waveform in the generator each time the modulator produces an output pulse. Range sweep generator 3 is adjusted to produce an output waveform having a period equal to the time interval between pulses generated by the modulator 1. In the present embodiment this pulse period is of the order of ten microseconds i.e., the repetition rate of modulator 1 is of the order of 100 kc. This interval is the time required for a radar having a range of one mile. The range sweep generator 3 may be any well known type of externally triggered sawtooth wave generator. The output of generator 3 is fed to one input of a comparator 4, which comparator has its other input supplied from the second generator, known as the information rate generator 6. The free running information rate generator 6 generates a sawtooth wave of the continuously recurring type. The wave produced by generator 6 is of much lower repetition rate than that generated by range sweep generator 3. This repetition rate is preferably of the order of 1% of that of the generator 3 and in this embodiment would be of the order of one kc. There need not be any synchronization between the two generators; in fact greater accuracy is obtained when they are not synchronized. This will be explained more fully in connection with the description of FIG. 3. The comparator 4 is adapted to generate an output at each instant that the voltage level of the range sweep signal becomes equal to the voltage level of the information rate signal. This comparator may be of any well-known type such as a simple diode comparator. When the two signals are of the linearly decreasing, positive polarity type, as in the preferred embodiment described herein, the comparator may be arranged so that when the range sweep signal, shown as curve 3' in FIG. 3A, becomes less than the information rate signal, 6' in FIG. 3A, the comparator produces an output. This constitutes the normal operating sequence of a simple diode comparator. The leading edge of the comparator output is then indicative of the time when the amplitudes of the two input waves become equal. It may be noted that with the use of such a comparator the trailing edge of the comparator output occurs when the range sweep wave crosses the information wave during retrace, of the range sweep wave, such as at the point $t_{10}$ in FIG. 3A. The comparator output is then zero and the comparator is ready for the next instant of coincidence. The output of comparator 4 is conducted to the input of the receiver gate generator 5. This generator may be a blocking oscillator, and serves to produce a very short pulse in response to the leading edge of the signal from comparator 4. The generator 5 is adapted to be unresponsive to the trailing edge of the comparator signal. The output of the receiver gate generator 5 serves to activate the receiving system 7 and permit it to pass any pulse which it might be receiving at that instant. Received pulses which are thus permitted to pass through the receiving system may be conducted to a pulse stretcher and amplitude selector (not shown) or directly to the metering circuit 9. The receiver activating means may be any well-known type of electronic switch. For example, a diode arrangement similar to that shown in FIG. 2 could be used. If the pulse conducted through the receiving system is of sufficient amplitude and time duration to activate the metering circuit 9 then the pulse stretcher and amplitude selector is not necessary. If the receiving system does not produce such a pulse, then such a pulse modifier may be used to modify the received pulse in order to permit it to activate metering circuit 9. The pulse stretcher and amplitude selector may be of any type and is well known in the art. When the metering circuit 9 is activated by a pulse from the receiving system 7, it is turned on for the relatively short period during which a pulse is being transmitted. During this short time the metering circuit permits the voltage appearing at the output of information rate generator 6 to be transmitted thru the metering circuit to an altitude indicator 10. The altitude indicator 10 may be of any well known voltage responsive type. The metering circuit 9 also serves to store a portion of the information signal which it receives during its "on" and to retain that voltage level until the next instant when the circuit is turned on. The output of the metering circuit 9 also may be conducted to a differentiator 11 the output of which would indicate the rate of ascent or descent of the vehicle at indicator 12. Both the circuit 11 and 12 may be of types well known to those skilled in the art.

Referring now to FIG. 2 there is shown a schematic diagram of a simple form of measuring circuit which could be used in the practice of this invention. This circuit receives the voltage from the information rate generator 6 at terminal 15. The pulse from the receiving system 7 is received at terminal 16. The signal impressed on terminal 15 is passed through resistor 17 to terminal 30. When there is no input to terminal 16, terminal 30 is positive with respect to terminal 31 and all the current at terminal 30 passes through the diode 19 which, in its forward conducting state, exhibits a very low resistance. The capacitor 18 serves to maintain an infinite impedance to direct current between terminals 31 and 16. When a pulse is applied from receiver system 7 to the terminal 16 it serves to drive the voltage of terminal 31 above that of terminal 30. At this instant diode 19 is effectively rendered non-conducting and the capacitor 21 is permitted to charge up to the level of terminal 30. This voltage is therefore proportional to the voltage appearing at terminal 15 at the instant that a pulse appears at terminal 16. At the end of the period during which there is a pulse on terminal 16 the diode 19 is once again placed in the conducting state and all of the current passing through resistor 17 follows the path through diode 19 and resistor 20 to ground, and capacitor 21 is prevented from discharging by means of the blocking diode 32. Resistor 22 and capacitor 23 constitute a smoothing circuit for the voltage across the capacitor 21. The output of the measuring circuit is produced at terminal 24. This output, when connected to a high impedance voltage indicating device, serves to indicate the vehicle altitude.

Figure 3B:
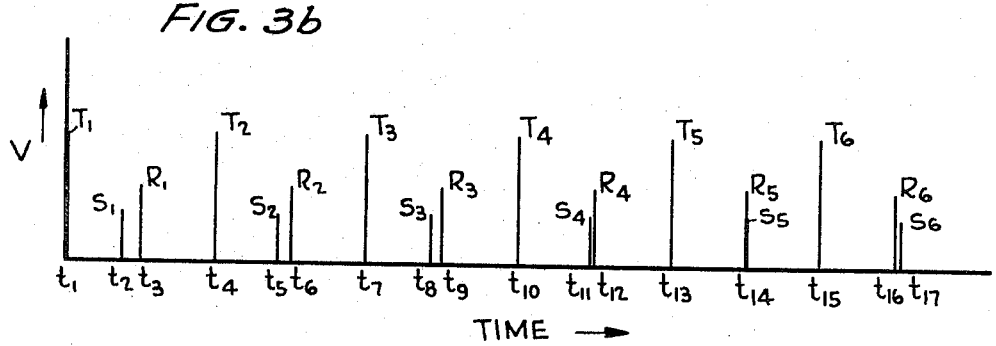

Having described the structure of a preferred embodiment of this invention, its operation will now be described with reference to FIGS. 3A to 3C. Referring to FIG. 3A there are shown waveforms designated by numeral 3', which represents the output of the range sweep generator 3 of FIG. 1, and 6', which represents a portion of one wave produced by the information rate generator 6. The points along the horizontal axis of the graph, designated by $t_1$, $t_4$, $t_7$, $t_{10}$, $t_{13}$ and $t_{15}$, represent those points in time when the pulse modulator 1 produces an output pulse which triggers the start of the sweep of range sweep generator 3. The voltages represented by the numerals 3' and 6' are compared in comparator 4 and at the times when they are equal a signal is produced at the output of comparator 4. These times are shown in FIG. 3A at co-ordinates $t_2$, $t_5$, $t_8$, $t_{11}$, $t_{14}$ and $t_{17}$. These signals are fed to receiver gate generator 5 at the output of which is produced the pulses represented in FIG. 3B by $S_1$, $S_2$, . . . $S_6$. FIG. 3B also illustrates pulses $T_1$, $T_2$, . . . $T_6$, which represent the pulses produced by the radar pulse modulator 1, and the pulses $R_1$, $R_2$, . . . $R_6$, which represent the reflected pulses received at the antenna 14 of receiving system 7, and which occur at times $t_3$, $t_6$, $t_9$, $t_{12}$, $t_{14}$ and $t_{16}$. As may be noted by observation of FIG. 3B, during one sweep of the information signal 6' the time interval between a transmitted pulse and a corresponding pulse generated by receiver gate generator 5 increases slightly for each succeeding pulse generated by the modulator 1. This has the effect of causing the pulses transmitted by receiver gate generator 5 to scan the radar sweep range at a rate equal to the repetition rate of the information signal 6'. Since this scanning operation occurs at a much lower rate than the actual time between pulse transmission and reception, the result is an altitude indication of much higher resolution than has been heretofore possible. At the instant that a pulse produced by comparator 4 coincides with a pulse received by the receiving system 7, the metering circuit 9 is placed in its "on" condition. This is illustrated in FIG. 3b at the time $t_{14}$ where the pulses $S_5$ and $R_5$ are shown to coincide. At this instant the voltage output of information rate generator 6 is impressed on the storage means of metering circuit 9.

Figure 3C:
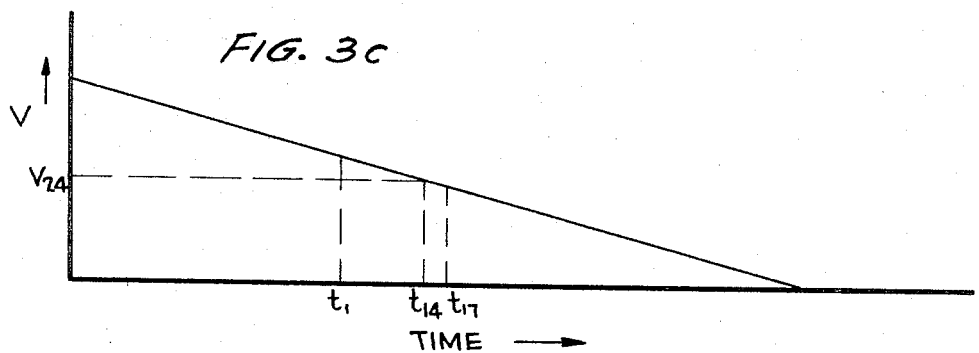

FIG. 3C shows one full cycle of an information rate signal 6'. Since the curve of this figure is on a scale which is compressed in time with respect to the time scale of FIGS. 3A and 3B, the time $t_0$ to $t_{18}$ on the first two figures is seen to occupy a much smaller portion of the scale of FIG. 3C. The time when the amplitude of signal 6' is conducted to the storage capacitor 21 of measuring circuit 9 is indicated on FIG. 3C at time $t_{14}$ where the voltage input is $V_{24}$. It may be noted that the use of a decreasing waveform of positive polarity for the information rate signal enhances the accuracy of altitude indication. This is so because, due to the polarity of diode 32 of the circuit 9 of FIG. 2, the storage capacitor 21 only receives positive voltages during its "on" periods. Since the voltage appearing at input 15 of circuit 9 has the waveform shown in FIG. 3C, the capacitor 21 will charge to the voltage of the input signal rather quickly when a gate signal is present and will remain at that voltage even though the gate signal at terminal 16 of circuit 9 is modified so as to have a relatively long duration. This is so because although the input signal at terminal 15 is decreasing, the diode 32 prevents the capacitor current from discharging back through diode 19 and resistor 20. Thus, once the capacitor voltage has initially become equal to the input voltage, it remains at that voltage.

Due to the fact that the receiver gate pulse produced at the output of comparator 4 advances a discrete interval for each pulse generated by the pulse modulator 1, this system would have an inherent measuring error if the start of a sawtooth wave from generator 6 were synchronized at the start of a sawtooth wave from generator 3. This is true because if the two signals were so synchronized, the range sweep signal 3' would intercept the exact same group of values of the information signal 6' for each sweep of the information signal. This would create an inherent ambiguity since altitudes representative by voltage levels of the information signal occurring between these interception points could never be indicated. This is overcome in the present invention by adjusting the repetition rate of the information rate generator 6 so that the range sweep rate is not an integral multiple of the information signal rate. This permits the range sweep signals to intercept a different group of information signal voltages for each succeeding sweep of the information signal. Thus, over a plurality of sweeps of the information signal this ambiguity is eliminated.

It may be noted that the linearity of the reading of this altimeter is not dependent on the linearity of the information signal, but is dependent only on the linearity of the range sweep signal. This is true because regardless of the shape of the information signal it can only be transmitted to the storage means of metering circuit 9 at the instant when its amplitude is equal to that amplitude of the range sweep signal existing at the instant of return of a transmitted pulse. The great value of applying the information signal to the measuring circuit rather than the range sweep signal lies in the fact that during the measuring time the information signal maintains essentially a constant value. Over the same measuring interval the range sweep signal changes in amplitude considerably. Therefore a great decrease in measuring means response time requirements is achieved by the present invention.

Since linearity of the information signal is not necessary, it is possible to achieve greater sensitivity over certain altitude ranges by employing a non-linear information signal. As an example, if it were desired to achieve a greater resolution in the altitude reading at very low altitudes, it would be possible to obtain this result by employing an information rate signal which had a small slope during its initial portion and a larger slope for its latter portion. Since this would mean that the information signal would change by a smaller amount between succeeding sweeps of the range sweep signal during the initial portion of the information signal sweep, a greater sensitivity would be achieved. Since the accuracy of the altitude indication is dependent on the amount by which the amplitude of the information sweep signal changes during the interval between succeeding moments of coincidence between the two sweep voltages, it may be noted as a general rule that range resolution and sensitivity is directly proportional to the repetition rate of the radar pulse modulator and inversely proportional to the time rate of change of the information rate waveform. Further, the system response time to changes in altitude is proportional to the repetition rate of the information rate signal.

Thus it may be seen that the invention described above represents a radar altimeter of greatly improved flexibility and sensitivity.

It will be apparent that the embodiment shown is only exemplary and that various modifications can be made in construction and arrangement within the scope of the invention as defined in the appended claims.

We claim as our invention:

1. In a pulse modulation radar system comprising a receiver system, an altitude indicator comprising:
    (a) first generator means for producing linear voltage waveforms in response to pulses produced by said radar system,
    (b) second generator means for producing a continuously recurring voltage waveform,
    (c) comparator means for receiving the outputs of said first and second generators and for producing an output pulse at each time that an equality exists between said generator outputs,
(d) metering means having an information input and a gating input,
(e) means connecting the output of said second generator means to said metering means information input,
(f) means controlled jointly by the output of said comparator means and by pulses received by said radar receiver system to apply a gating pulse to said metering means gating input whenever a pulse produced at the output of said comparator means coincides in time with the return of a transmitted pulse to said radar system, and
(g) information storage means connected to store the voltage appearing at said information input of said metering means at each instant that a pulse appears at said gating input of said metering means.

2. An altimeter as recited in claim 1 wherein the waveforms produced by said second generator are linear in nature.

3. An altimeter as recited in claim 1 wherein the repetition rate of the waveforms produced by said second generator is less than 1% of the repetition rate of the waveforms produced by said first generator.

4. An altimeter as recited in claim 1 wherein the repetition rate of the waveforms produced by said second generator is less than 10% of the repetition rate of the waveforms produced by said first generator.

5. An altimeter as recited in claim 1 wherein the waveforms produced by said second generator are non-linear in nature.

6. An altimeter as recited in claim 1, further comprising voltage responsive indicating means connected to said information storage means and adapted to indicate the amplitude of the voltage stored on said storage means.

7. An altimeter as recited in claim 5 wherein each of the non-linear waveforms produced by said second generator has a larger slope in its latter portion than in its initial portion.

8. An altimeter as recited in claim 6, further comprising additional means connected to the output of said information storage means and adapted to provide an indication of the rate of change of voltage on said storage means.

9. In combination with a pulse modulated radar system comprising a radar pulse modulator, a transmitter, and a receiving system, an altimeter comprising:
(a) first generator means receiving pulses produced by said radar pulse modulator and generating a constantly increasing voltage each time a pulse is so received,
(b) second generator means for producing a series of identical voltage waveforms, each of which waveforms is characterized by a slope of constant polarity,
(c) comparator means comprising a pair of input terminals connected, respectively, to the outputs of said first and second generator means, and further comprising an output terminal, said comparator means being adapted to produce a pulse at its output terminal at each instant that the pair of voltages appearing at its input terminals have identical values,
(d) gate generator means comprising an input terminal and an output terminal and adapted to produce a sharp pulse at its output terminal at each instant that said gate generator receives a pulse at its input terminal,
(e) conductor means connecting the output terminal of said comparator means to the input terminal of said gate generator means,
(f) activating means connecting the output of said gate generator means to said radar receiving system and adapted to maintain said receiving system in an activated condition only during the time that a pulse is appearing at the output of said generator means,
(g) gate control means connected to an output of said radar receiving system, and adapted to accept radar pulses received by said receiving system only when said receiving system is in its activated condition,
(h) metering means comprising an information input and a gating input,
(i) second conductor means connecting the output of said second generator means to the information input of said measuring means,
(j) third conductor means connecting said gate control means to the gating input of said metering means and adapted to transmit to said metering means gating input pulses received by said gate control means,
(k) storage means connected to said measuring means information input and controlled by said measuring means gating input in such a manner as to receive and store the voltage appearing at said measuring means information input only during those periods of time when a voltage pulse received by said radar receiving system is present at said measuring means gating input, and
(l) voltage responsive indicating means connected to said storage means and adapted to continuously indicate the amplitude of the voltage present on said storage means.

10. A pulse radar altimeter as recited in claim 9 wherein said gate control means further comprises pulse stretching means adapted to receive pulses impressed on said gate control means and to produce pulses in response thereto having a greater time duration than those received.

11. A pulse radar altimeter as recited in claim 9 wherein said gate control means further comprises a pulse amplifier means interposed between said radar receiving system and said third conductor means and operatively interconnected therewith.

12. A pulse radar altimeter as recited in claim 9 further comprising additional voltage responsive means connected to said storage means and adapted to indicate the rate of change of voltage present on said storage means.

13. A radar altimeter as recited in claim 9 wherein each of the waveforms produced by said second generator has a constant slope.

14. A radar altimeter as recited in claim 9 wherein each of the waveforms produced by said second generator has a variable slope.

15. An altimeter as recited in claim 9 wherein the repetition rate of the output of said second generator is less than 10% of the repetition rate of the output of said first generator.

16. A radar altimeter as recited in claim 9 wherein the repetition rate of the output of said second generator is less than 1% of the repetition rate of the output of said first generator.

References Cited by the Examiner
UNITED STATES PATENTS
3,054,103  9/1962  De Faymoreau _____ 343—13

CHESTER L. JUSTUS, *Primary Examiner.*

KATHLEEN H. CLAFFY, RODNEY D. BENNETT,
*Examiners.*

D. MEXIC, R. E. KLEIN, J. P. MORRIS,
*Assistant Examiners.*